UNITED STATES PATENT OFFICE.

ADOLF BAEYER, OF MUNICH, BAVARIA, GERMANY.

MANUFACTURE OF SOLUBLE DERIVATIVES OF INDIGO-BLUE.

SPECIFICATION forming part of Letters Patent No. 251,501, dated December 27, 1881.

Application filed July 27, 1881. (No specimens.)

*To all whom it may concern:*

Be it known that I, ADOLF BAEYER, a subject of the King of Bavaria, residing at Munich, in the Kingdom of Bavaria and Empire of Germany, have invented new and useful Improvements in the Manufacture of Soluble Derivatives of Indigo-Blue, Suitable for Dyeing and Printing, of which the following is a specification.

This invention consists in the discovery that by the action of alkaline pyrosulphates upon indigo-white or reduced indigo an alkaline salt of indigo-white sulphonic acid may be obtained, which is soluble in water, and capable of being converted into indigo-blue upon treatment with acid and oxidizing agents.

In carrying out my invention I take about one part, by weight, of finely-powdered indigo, and I mix the same with about one part, by weight, of ferrous sulphate, (green vitriol or copperas;) about from three to four parts, by weight, of caustic potash; about from three to four parts, by weight, of pyrosulphate of potash, and about two parts of water. I then heat the said mixture in a closed vessel to a temperature of about 60° centigrade during about twelve hours, and afterward the contents of the vessel are diluted with water and filtered. The filtered liquor is allowed to stand in contact with air until the reduced indigo contained therein has become oxidized and precipitated. After filtering again a clear solution is obtained, which is evaporated to a small bulk in order to crystallize the sulphate of potash contained therein. The mother-liquor is filtered off, and it contains the potassium salt of my new indigo-white sulphonic acid, which may be evaporated to dryness.

The characteristic properties of the new alkaline salt of indigo-white sulphonic acid are the following: It is readily soluble in water, and easily decomposed by mineral acids into indigo-white and sulphuric acid. A mixture of oxidizing agents and mineral acids—such as, for instance, perchloride of iron and muriatic acid—converts it into indigo-blue.

What I claim as new, and desire to secure by Letters Patent, is—

1. As a new article of manufacture, the alkaline preparation of indigo-white sulphonic acid above described, having the characteristics herein set forth.

2. The within-described process for the production of an alkaline salt of indigo-white sulphonic acid by the action upon indigo of alkaline pyrosulphates conjoined with the action of reducing agents, such as ferrous sulphate and alkalies, substantially in the manner herein set forth.

In testimony whereof I have hereunto set my hand in the presence of two subscribing witnesses.

ADOLF BAEYER.

Witnesses:
 PAUL FRIEDLAENDER,
 LUDVIG LUNDSBERG.